United States Patent [19]

Grinage, Jr.

[11] Patent Number: 5,741,110
[45] Date of Patent: Apr. 21, 1998

[54] FRONT LOADING TRUCK RACK FOR WHEELED LOADS

[76] Inventor: Lloyd Grinage, Jr., 131 S. Machias Rd., Snohomish, Wash. 98290

[21] Appl. No.: 775,965

[22] Filed: Jan. 3, 1997

[51] Int. Cl.⁶ ........................................ B60P 3/10
[52] U.S. Cl. ........................... 414/462; 224/402
[58] Field of Search .................... 224/310, 402; 414/462

[56] References Cited

U.S. PATENT DOCUMENTS

| | | |
|---|---|---|
| 3,411,644 | 11/1968 | Cook . |
| 3,648,866 | 3/1972 | Slown . |
| 3,732,998 | 5/1973 | Martin . |
| 3,734,321 | 5/1973 | Long et al. . |
| 3,840,133 | 10/1974 | Berg . |
| 4,603,798 | 8/1986 | Griswold ................ 414/462 |
| 4,953,757 | 9/1990 | Stevens et al. ............ 224/310 |
| 5,069,595 | 12/1991 | Smith et al. ............... 414/462 |
| 5,071,308 | 12/1991 | Tibbet ........................ 414/462 |
| 5,505,579 | 4/1996 | Ray et al. .................. 414/462 |
| 5,586,856 | 12/1996 | Sringe ....................... 414/462 |
| 5,609,462 | 3/1997 | Reimer ...................... 414/462 |

*Primary Examiner*—Karen B. Merritt
*Assistant Examiner*—Gregory A. Morse
*Attorney, Agent, or Firm*—Frank J. Dykas

[57] ABSTRACT

A front loading truck rack for wheeled loads such as boat trailers, golf carts, all terrain vehicles, and three or four wheeled loads. The truck rack allows a load to be loaded onto a pickup while a fifth wheel trailer is attached to the pickup, and the rack takes up a minimum of space in the truck bed, to accommodate the clearance needed for a fifth wheel trailer when turning or backing. The truck rack allows the user to load and transport loads with little or no lifting required by the user.

8 Claims, 7 Drawing Sheets

FRONT LOADING TRUCK RACK FOR WHEELED LOADS

BACKGROUND OF THE INVENTION

1. Technical Field

The present invention generally relates to load-carrying racks for pickups, and more particularly to racks which load from the front of the pickup, thus enabling the pickup to remain connected to a fifth-wheel trailer or other towed loads.

2. Background

Devices which are built to carry loads on pickups are well known and come in a variety of designs. Racks for the loading of boats onto pickups are especially common. Most of these involve loading a boat from the rear of a pickup on to the bed or a rack above the bed and cab of the pickup. Typically these racks have three points of support, since a boat trailer is usually a three-wheeled device. Such a rack has two outside tracks for the trailer wheels and a middle track or connection for attaching, supporting or guiding the trailer hitch or the trailer front wheel. There are some racks for pickups which also load from the front. Loading from the front enables the operator of the pickup to remain connected to a fifth wheel trailer or other object being towed by the pickup, while loading a boat or other object from the front of the truck. However, none of the existing loading devices for front loading an object such as a boat will allow the rack to be utilized while in connection with a fifth wheel trailer.

Fifth wheel trailers are typically a long, heavy trailer, which is supported by wheels toward the rear of the trailer and a hitch which connects to a towing connection mounted in the bed of a pickup. Fifth wheel trailers are typically heavy devices commonly weighing 8000 to 15,000 pounds and extending 17 to 39 feet from the hitch connection. Tow-behind trailers are available which are the same size as a fifth wheel trailer, but fifth wheel trailers have certain advantages over towed trailers. Since the hitch pin of a fifth wheel trailer is connected to the bed of the pickup, significant weight from the fifth wheel trailer can be transferred to the four wheels of the pickup. This distributes the load of the trailer and results in much better handling than an equivalent weight of towed trailer. The weight of a fifth wheel trailer is preferably mounted directly above or slightly in front of the rear axle of the pickup. If it is mounted in this position, some of the weight of the fifth wheel trailer is transferred not only to the rear axle of the pickup, but also to the front axle of the pickup. This is much preferable to a situation in which a fifth wheel trailer is mounted to the rear of the rear axle of the pickup. In that case, weight is transferred to the rear axle of the pickup, but that axle acts as a fulcrum and the frame of the pickup acts as a lever, and the front axle of the pickup is lightened or slightly lifted. This results in decreased traction of the steering wheels of the pickup, and decreased handling characteristics in wind, icy or wet roads, or other bad driving conditions. Therefore, it is extremely important for the proper weight distribution of a fifth wheel trailer for its connection to be mounted above the rear axle of the pickup or slightly in front of the rear axle of the pickup. When properly mounted in this position, the front of the fifth wheel trailer can come to within a few inches of the cab of the pickup.

In order to maneuver a fifth wheel trailer with a pickup, the fifth wheel and pickup may sometimes be required to be at 90° angles to each other, in turning or backing. When a fifth wheel trailer is at 90° to the pickup towing it, the fifth wheel trailer may be as close as two inches to the cab of the pickup. This necessity for clearance behind the cab of the pickup presents a problem for load carrying devices which utilize more than a few inches of bed space. To operate a fifth wheel trailer with an over-the-cab load-carrying rack, the rack typically must take up no more than a few inches of the bed, depending on the fifth wheel, and as little as two inches is preferable.

Another problem with many front-loading boat carrying racks is that the rack is designed to carry the boat in an inverted position. This results in placing the boat in a position that obstructs the driver's view of overhead traffic signals. It also places the boat in a position in which it is impossible to use the shape of the boat as a storage area for other items.

Current devices for loading an object such as a boat over the front of the pickup on to a rack above the cab of the pickup also do not provide a means of loading the boat trailer. They also require the user to perform acts of lifting the boat. The weight that is required of the user to lift will thus vary according to the weight of the boat and the style of the rack. He may have to drag the boat to the loading ramp, he may have to flip it on its side, or he may have to lift the tongue of the boat or the boat and the rack into the transport position.

What is needed is a rack which loads from the front of the pickup, takes up a minimum of bed space, is able to load a boat and its trailer with the boat in an upright position for storage of other items, and in which the user does not have to lift any weight at all. The advantage of the user not having to lift any weight at all in this kind of situation is that there is a large population of pickup owners who tow a fifth wheel trailer and have the need to also tow or transport other objects, such as golf carts, boats, jet skis on a trailer, snowmobiles on a trailer, all-terrain vehicles, canoes, race cars or other objects. Many of these people are retired people who live in a cold climate during one part of the year, and travel to a warmer part of the country during the winter to enjoy a more favorable climate. These "snowbirds" may not be able to lift any weight at all, but would like to drive their pickup, fifth wheel trailer and their boat or other gear with them in their seasonal travels. Accordingly, it is an object of the invention to provide a front-loading truck rack for wheeled loads which takes up a minimum of bed space, thus allowing it to be used concurrently with a fifth wheel trailer.

A further object of the invention is to provide a front loading truck rack which utilizes a two-rail system, thus making it optimal for wheeled 4-wheeled vehicles, such as golf carts, ATVs, and race cars, but which also can accommodate 3-wheeled vehicles, such as a boat trailer.

A further object of the invention is to provide a front-loading truck rack in which a substantial load is able to be lifted, secured, and transported on the rack with no lifting at all required by the operator.

It is a further object of the invention to provide a front-loading truck rack which provides for the upright storage and transport of boats, so that the boat does not obscure vision as an inverted boat does, and so that the upright boat may be used as a storage area for other objects.

A further object of the invention is to provide a front-loading truck rack in which the operator does not have to turn a winch handle, and in which he can operate an electric winch from a location remote from the truck.

Additional objects, advantages and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

DISCLOSURE OF INVENTION

According to the present invention, the foregoing and other objects and advantages are attained by a front-loading truck rack for carrying wheeled loads, which is mounted on a pickup. The wheeled loads can include such items as a 3-wheeled boat trailer with or without a boat, 4-wheeled objects such as golf carts, all-terrain vehicles, small race cars, jet skis or snowmobiles on trailers, or other 4-wheeled devices, including a 4-wheeled storage box. Other 3-wheeled objects can also be loaded and transported. The front-loading truck rack consists of a rear frame, which is basically a rectangular shape, or trapezoidal which is made for attachment to the front of the bed of a pickup, immediately behind the cab. The rear frame is designed so than a minimum of bed space is utilized in its mounting, which allows unobstructed turning of an attached fifth wheel trailer. The rear frame is for the support of the first and second wheel tracks and the load.

The front-loading truck rack also includes a front frame. The front frame is a rectangular frame which attaches to the front of a pickup. It can attach to the bumper of the pickup, but preferably is attached to the frame of the pickup by connections which pass under the bumper. The front frame is for the support of the two wheel tracks and the load.

The front-loading truck rack also includes a first and second wheel track, which attaches to the rear frame and the front frame at the ends of each wheel track. The wheel tracks may be a number of shapes, which provide support and guidance to wheeled vehicles, including an I-shape, a U-shape, a V-shape, or a semi-circular or curved shape.

The front-loading truck rack also includes a first and second ramp, which attach to the forward end of the first and second wheel track, and provide ramps which guide the wheeled vehicle being lifted onto the rack.

The front-loading truck rack also includes the guide wheel assembly, which attaches to a three-wheeled load and is for the purpose of supporting the front of a load when the load is a three-wheeled vehicle. The guide wheel assembly includes a bar with a first and second guide wheel attached at its ends.

The front-loading truck rack includes an electric winch with winch cable wound on it. The winch cable attaches to the load and pulls it up the first and second ramps and along the first and second wheel tracks by winding the winch cable on to or off of the electric winch. In this manner, the operator is not required to lift any of the weight of the load. Also included is a winch control module which is remote from the pickup, and which is in communication with the winch. This allows the user to stand away from the pickup to operate the winch. Also included is a means of securing loads to the front or rear frame, or to the wheel tracks.

The front-loading truck rack may also include a guide pulley mounted on the upper member of the front frame, for guiding the winch cable over the front frame as the load is raised or lowered on the first and second ramps.

The front-loading truck rack can also include a tongue support which mounts on the top horizontal member of the front frame, and supports a part of the weight of the load, typically used when the load is a three-wheeled load.

The front-loading truck rack can include a winch control module which communicates with the winch by means of conductive wires, or by a remotely controlled module which utilizes radio signals.

The front-loading truck rack can also include means of securing loads to the front or rear frame or to the wheel tracks. This means of securing loads can be by the use of chains and come-alongs, or by nylon straps with adjusting buckles, or by elastic straps with attachment devices, or by other conventional means.

The front-loading truck rack can also include a trailer hitch adapter on the front frame, so that a trailer can be attached to the front frame of the pickup, for instance to launch a boat from a boat trailer using the front-mounted trailer hitch.

The apparatus of the invention thus allows a fifth wheel trailer to remain attached to a pickup while loading, transporting and unloading a wheeled load. If the wheeled load is a boat, the boat may be launched with the fifth-wheel trailer still attached to the pickup. This device provides for lifting, loading and transporting such a load without requiring the operator to lift any weight at all. The rack is mounted to utilize the minimum of pickup bed space, so that a fifth wheel trailer may be attached to the pickup above or forward of the rear axle, and so that the pickup can make sharp turns and the fifth wheel trailer will not contact the rear frame of the device. The device also provides for upright transporting of a boat, which improves visibility over an inverted position for the driver while viewing traffic lights, and also provides a storage area for additional objects inside the boat.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of modification in various obvious respects, all without departing from the invention. Accordingly, the drawings and description are to be regarded as illustrative in nature, and not restrictive.

BEST MODE FOR CARRYING OUT INVENTION

Figure 1:
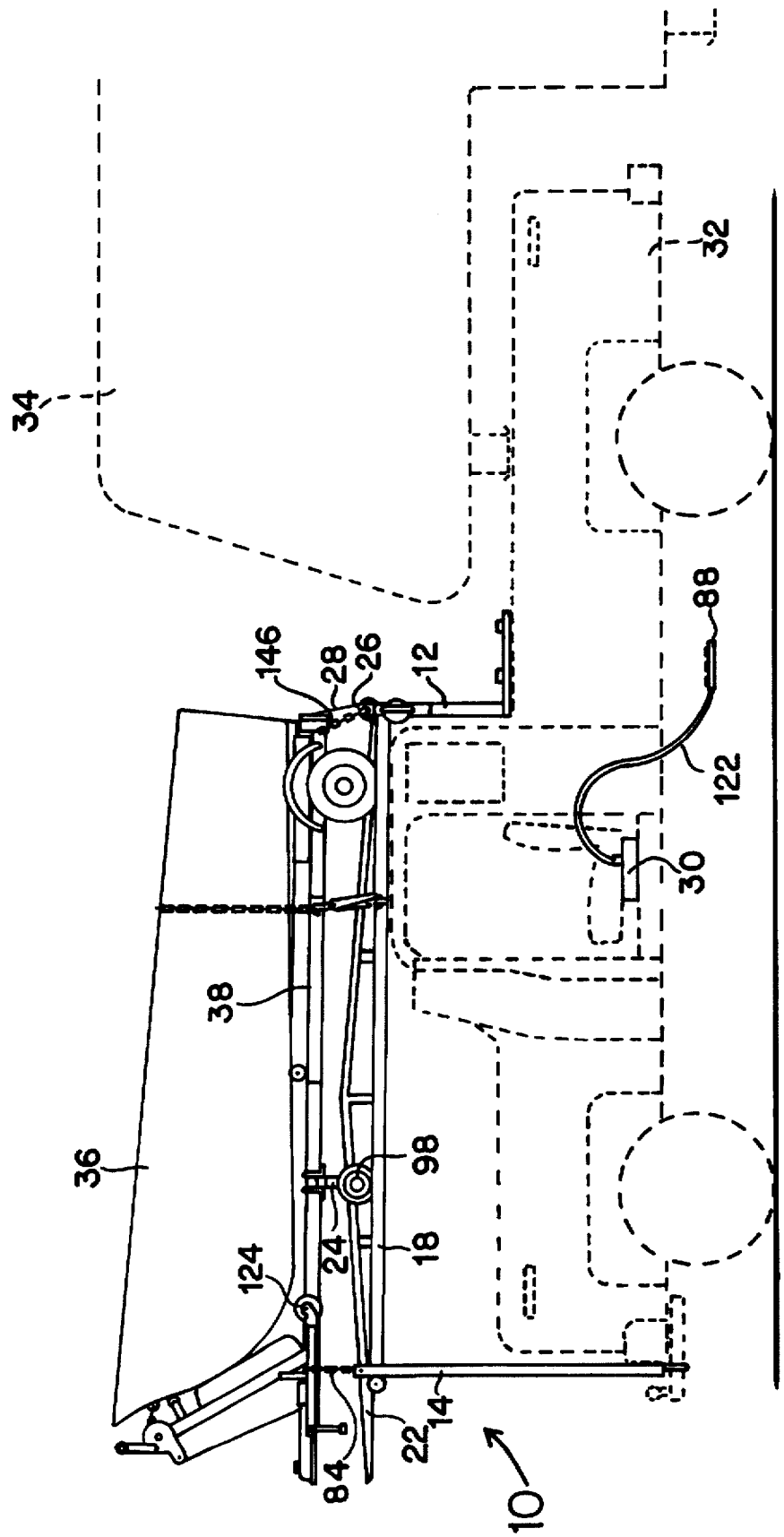
FIG. 1 is a side view of the front loading truck rack with a boat trailer and boat mounted in position for travel.

The front-loading truck rack 10 is shown in FIG. 1. It consists of rear frame 12, front frame 14, first and second wheel tracks 16 and 18, first and second ramps 20 and 22, guide wheel assembly 24, electric winch 26, winch cable 28, and winch control module 30. The sub-assemblies of the frame are pre-welded together, and are then fastened to each other by nuts, bolts and washers. The rear frame and front frame are constructed of 1.5 inch square steel tubing, with ⅛ inch walls, and the first and second wheel track and the first and second ramps are constructed of aluminum. Other materials could be utilized, but this combination has proven to be an optimum for strength and weight considerations.

Figure 2:
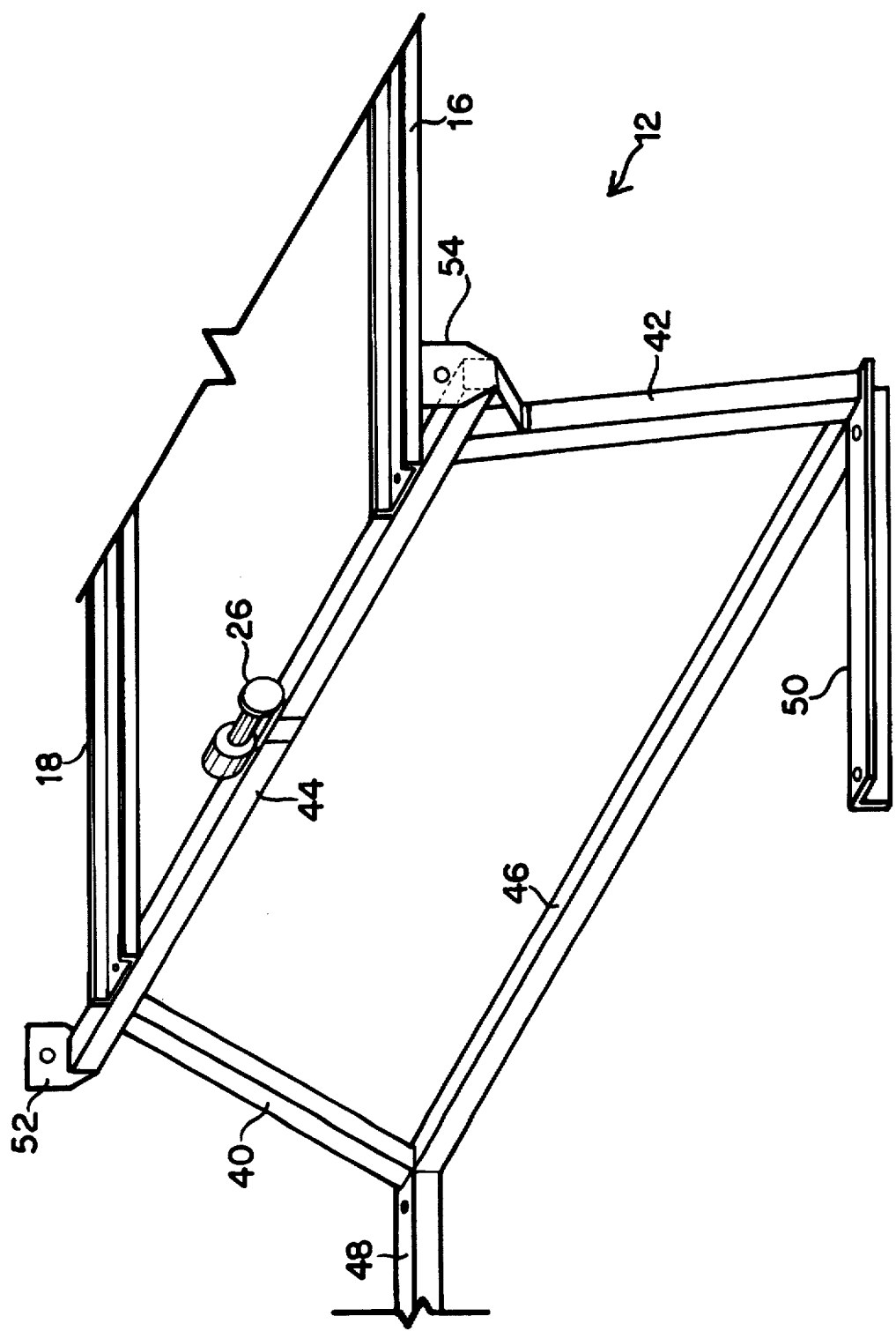
FIG. 2 is a perspective view of the rear frame.

The rear frame 12, as shown in FIG. 2, is a generally four sided structure, which is either rectangular or trapezoidal, with stabilizing extensions. It consists of a left and right vertical member 40 and 42, a top support rail 44, a bottom horizontal member 46, and a left and right support member 48 and 50. These members are 1.5" square steel tubing in the best mode, but other sizes, configurations or materials could be used. Attached to the top support rail 44, is an electric winch 26 and a left and right attachment bracket 52 and 54. Electric winch 26 is a 1000 pound 12-volt winch. In the best mode, the winch 26 is made by Superwinch, but any conventional winch, including manually operated winches, would work. In the best mode electric winch 26 has power-in and power-out capabilities for powered loading and unloading of the load.

Connected to electric winch 26 is winch control module 30 and control cable 122. In the best mode, winch control module 30 is mounted on the floor of the cab of the pickup, between the driver's seat and the driver's door, as shown in FIG. 1. In the best mode, winch control module 30 is an off-the-shelf product made by Superwinch which includes a plug-in for a 10 foot control cable 122 and hand held control unit 88.

Figure 3:
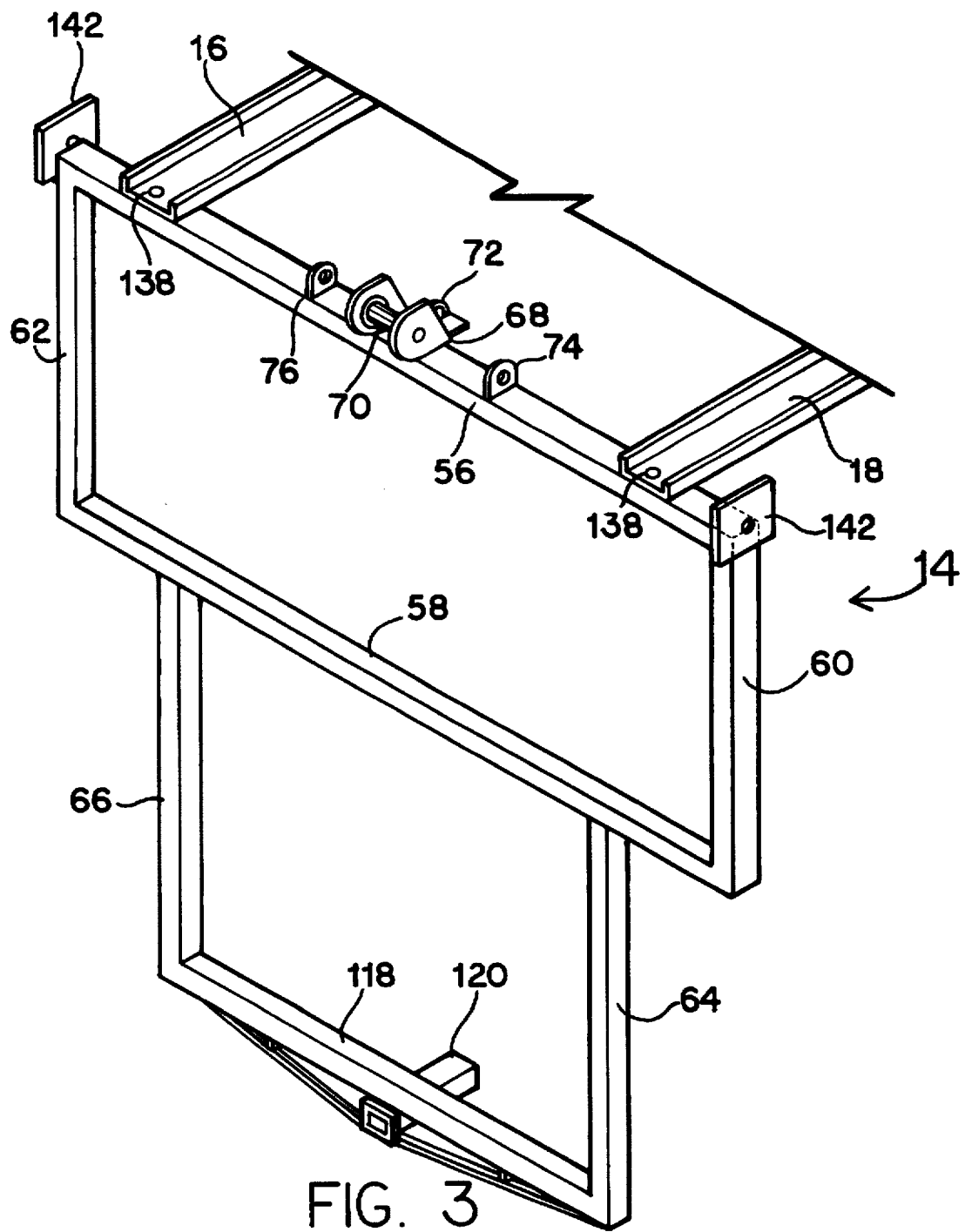
FIG. 3 is a perspective view of the front frame.

Front frame 14, best shown in FIG. 3, includes two generally rectangular frames. The first frame consists of a top horizontal member 56, a bottom horizontal member 58, a left vertical member 60, and a right vertical member 62. The second frame contains left and right vertical members 64 and 66, which are attached to and extend below bottom horizontal member 58. The second frame contains the left and right vertical members 64 and 66, which are attached to and extend below the bottom horizontal member 58. Attached to left and right vertical members 64 and 66 is lower horizontal member 118. Attached to lower horizontal member 118 is hitch bracket 120. Attached to the top horizontal member 56 is a pulley assembly bracket 68, a pulley 70 and a tongue brace receiver 72. Also attached to top horizontal member 56 are a left and right ramp lock 74 and 76. The members of front frame 14 are 1.5 inch square steel tubing in the best mode, but other sizes, configurations or materials could also be used. Attached to both the rear frame 12 and the front frame 14 are first wheel track 16 and second wheel track 18, as shown in FIGS. 2 and 3.

Figure 4:
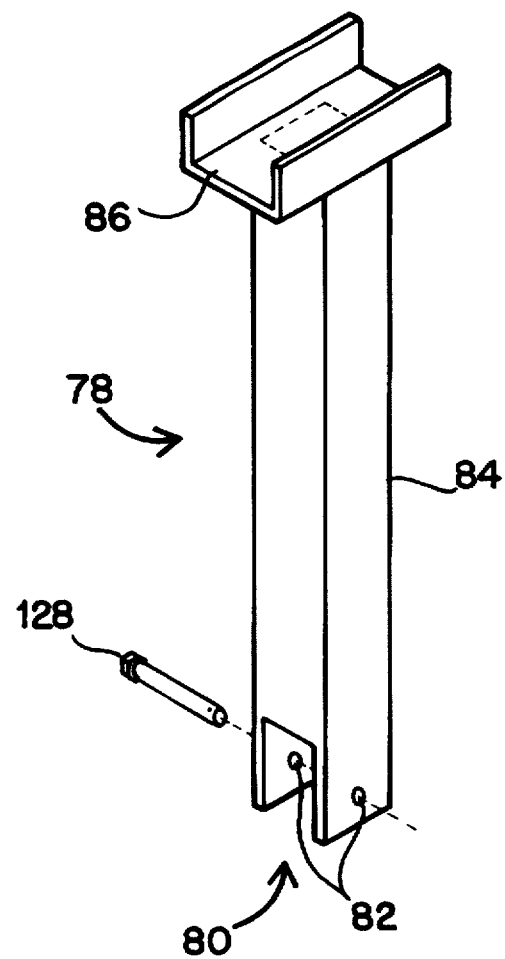
FIG. 4 is a perspective view of the tongue brace.

Tongue support 78, shown in FIG. 4, is a piece which is preferably steel and square in cross-section, although circular or other shapes and other materials, such as aluminum, would also work. Tongue support 78 consists of a shaft 84, a support tray 86, cutout 80, bolt holes 82 and bolt 128.

Figure 5:
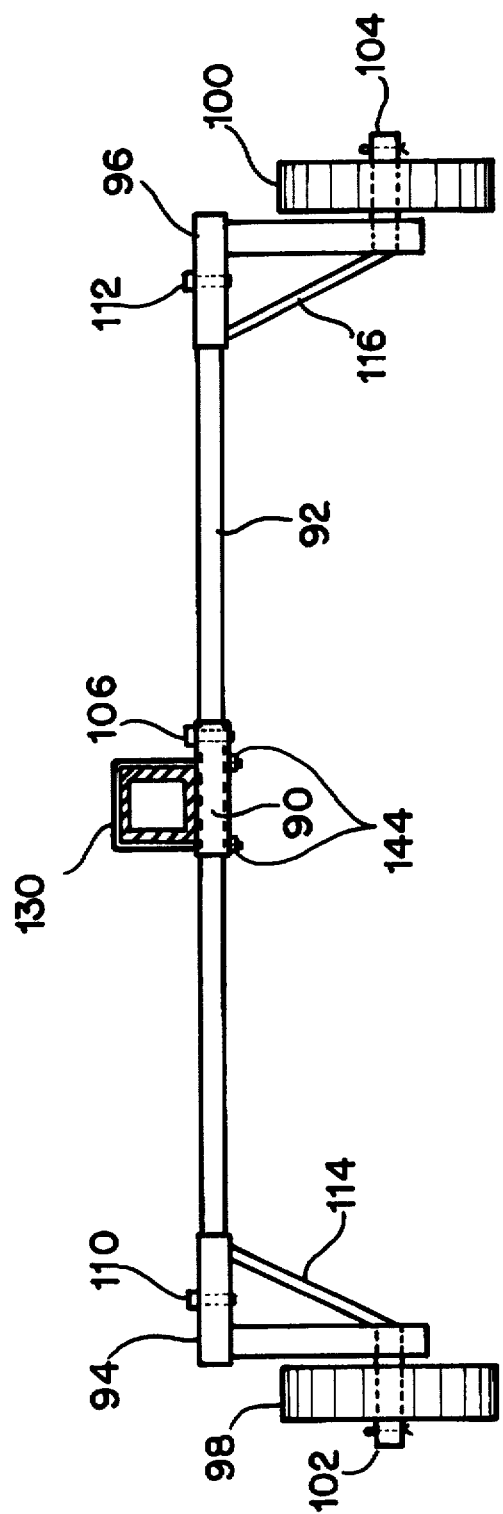
FIG. 5 is a front view of the guide wheel assembly.

Guide wheel assembly 24, shown in FIG. 5, in the best mode includes a tongue bracket 90, a tongue clamp 130, bolts 132, a bar 92, a left wheel bracket 94, a right wheel bracket 96, a left wheel 98, a right wheel 100, a left axle 102, a right axle 104, a tongue bracket bolt 106, a left wheel bracket bolt 110, and a right wheel bracket bolt 112, a left wheel bracket brace 114, and a right wheel bracket brace 116. In the best mode the bar 92 and the wheel brackets 94 and 96 are made of one inch square tubular steel, but other materials could also be utilized.

Figure 6:
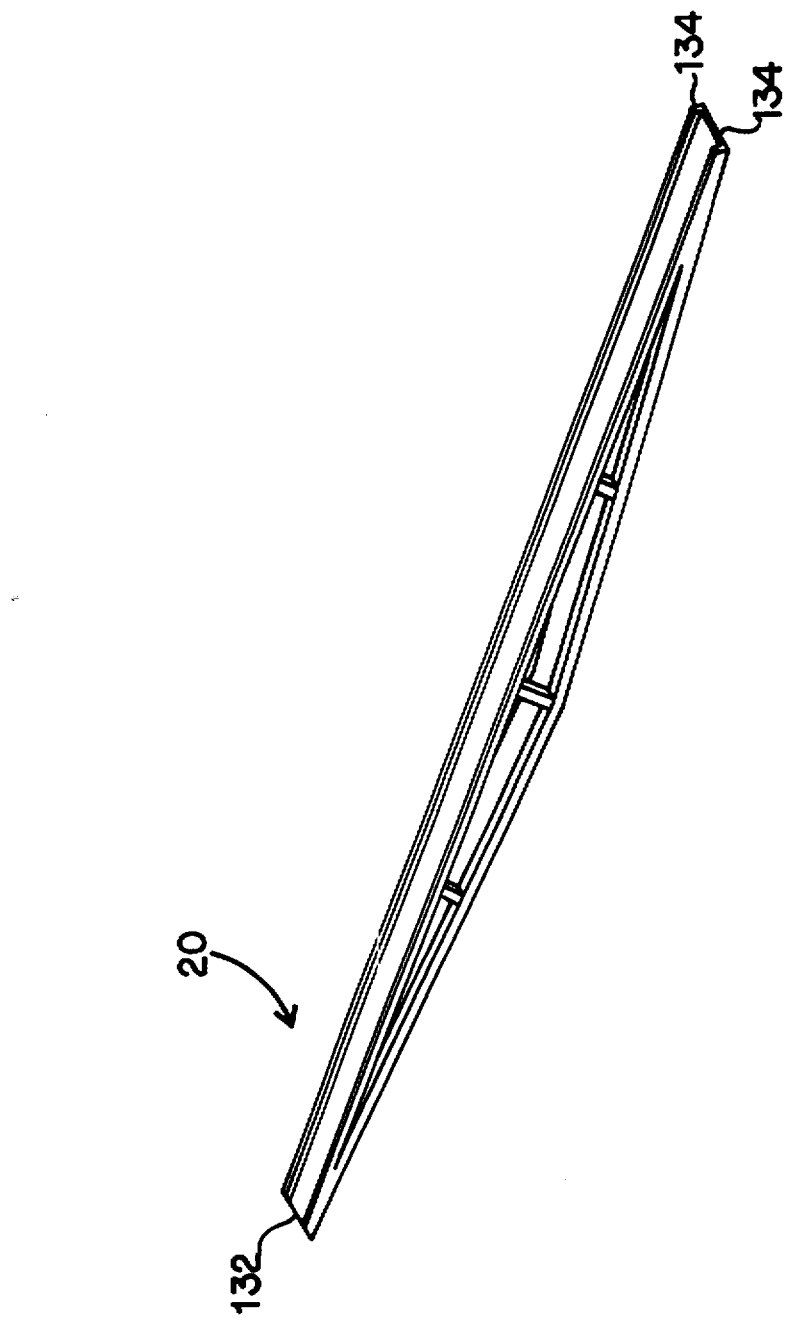
FIG. 6 is a perspective view of a ramp.

First and second ramp 20 and 22 are identical units, and only one will be described. FIG. 6 shows a ramp either 20 or 22. Ramp 20 or 22 consists of a U-shaped piece, which has a surface 132 upon which the wheels of the load travel and a side wall 134 on either side of that surface to guide the wheels of the load up the ramp. At one end of the ramp 20 or 22 is a pin (not shown) which extends below the surface of the ramp. This pin is for interfitting in a corresponding pin hole 138 in the wheel track 16 or 18, shown in FIG. 3.

In use, the front loading truck rack is installed by bolting the rear frame 12 to the top edge of the bed immediately behind the cab of pickup 32. The front frame 14 is installed by attachment to either the bumper or the frame of the pickup 32. Preferably the front frame 14 is mounted by attachment to the front frame of the pickup 32 by the use of a square tubing on the front frame 14 which fits inside a square bracket on the frame and is secured in place by bolts. The rear frame 12 and front frame 14 are connected to each other by the attachment of the first and second wheel tracks 16 and 18. Also mounted between the rear frame 12 and front frame 14 are the first and second ramps 20 and 22, which are transported and stored mounted to the rear frame 12 and front frame 14, as shown in FIG. 1.

Figure 7:
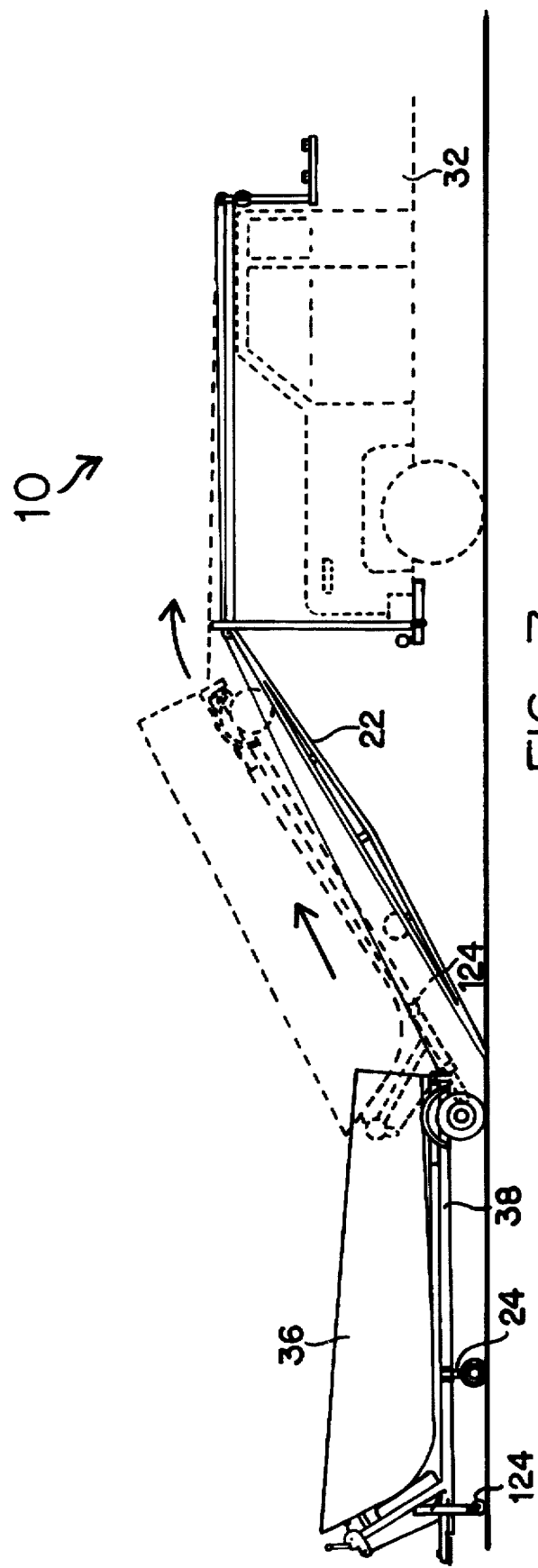
FIG. 7 is a side view of a boat and trailer being loaded on the front loading truck rack.

To use an example of a three-wheeled load being mounted on front loading truck rack 10, a three-wheeled boat trailer 38 with a boat 36 secured on it is used as an example. While the boat trailer 38 is on the ground, guide wheel assembly 24 is secured to the tongue of the boat trailer by tongue bracket 90 being attached to the tongue of boat trailer 38, using trailer tongue clamp 130 and bolts 144. The parts of guide wheel assembly 24 are assembled as shown in FIG. 5 with left wheel bracket 94 and right wheel bracket 96 mounted at the ends of bar 92 and secured by bolts 110 and 112. Right and left wheel brackets 94 and 96 have attached to them left wheel 98 and right wheel 100 on left axle 102 and right axle 104. With guide wheel assembly 24 mounted in place on the tongue of boat trailer 38, the tongue wheel 124 of boat trailer 38 is raised to its traveling position as shown in FIG. 1. With guide wheel assembly 24 thus mounted to boat trailer 38, boat trailer 38 with boat 36 attached to it is moved into position in front of pickup 32, which may have fifth wheel trailer 34 attached to it, as shown in FIG. 7.

The first and second ramps 20 and 22 are removed from their storage position on top of the front loading truck ramp 10. In the storage position, first wheel track 16 and second wheel track 18 are locked into place at left ramp lock 74 and right ramp lock 76, by the use of a padlock or other locking device (not shown). The first and second ramps 20 and 22 are shown in their storage position in Fig. 1. They are shown in their loading position in FIG. 7. A hole (not shown) in first and second ramp 20 and 22 is utilized for locking to left ramp lock 74 and right ramp lock 76.

The winch cable 28 is extended from electric winch 26, and attached to boat trailer 38, with the winch cable passing over pulley 70. The attachment is preferably by a hook (not shown) which fits around the axle of the boat trailer 38 or which attaches to a bracket or loop on the boat trailer 38. The boat trailer 38 is maneuvered so that the wheels of the boat trailer 38 are aligned with the first and second ramps 20 and 22. The tongue wheel 124 of the boat trailer 38 is moved to the upright position, as shown in FIG. 7.

The operator then activates the electric winch 26, which begins to wind in winch cable 28. As winch cable 28 is wound onto electric winch 26, it pulls boat trailer 38 up the first and second ramps 20 and 22, and onto and along the first and second wheel tracks 16 and 18. When the boat trailer 38 is at the rear end of the first and second wheel tracks 16 and 18, the operator stops the electric winch 28 from further operation.

The operator then installs tongue support 78 under the tongue of the boat trailer 38 by lifting the tongue of the boat trailer 38 approximately one inch. If the operator is not able to lift any weight at all, a lever (not shown) can be used to lift the tongue of the boat trailer 38 slightly. Tongue support 78 is installed by inserting a pin 128 through holes 82 in shaft 84 and tongue brace receiver 74. Tongue support 78 is installed for the purpose of taking weight off the wheel assembly 28 and the wheels 98 and 100. This protects these wheels from having to support the weight of the load, in this case a boat trailer 38 and a boat 36, while the pickup 32 travels over potentially rough roads.

The operator next secures the boat trailer 38 by attaching anchoring chains 146 to front attachment brackets 142 on the front frame 14 and left and right attachment brackets 52 and 54 on the rear frame 12. In this position the boat 36 and boat trailer 38 is ready for highway travel, and the fifth wheel trailer 34 could have remained attached the entire time, and the operator did not have to lift any weight. With the use of the control cable 122 and the hand held control unit 88, the operator can move around the ramps 20 and 22, and observe the boat trailer 38 being loaded.

To remove the boat trailer 38 or other load, the process is simply reversed. When the boat trailer 38 is off loaded, it can be attached to the front loading truck rack 10 at the hitch bracket 120, using a ball hitch (not shown). Once thus attached, the boat 36 can be launched by backing it with the pickup 32 down a boat launching ramp and into water. This can be done with the fifth wheel trailer 34 still attached.

While there is shown and described the present preferred embodiment of the invention, it is to be distinctly understood that this invention is not limited thereto but may be variously embodied to practice within the scope of the following claims.

I claim:

1. A front loading truck rack for carrying wheeled loads, for mounting on a pickup with a bed, a cab, a cab front, and a pickup front, comprising:

a rear frame with a first end and a second end, comprised of a rectangular frame for attachment to the front of the bed of the pickup behind the cab so that less than a minimum of bed space is utilized and which allows unobstructed turning of an attached fifth wheel trailer, and for support of the first and second wheel tracks and the load;

a front frame with a first end and a second end, comprised of a rectangular frame for attachment to the front of the pickup with its first end directly in front of the first end of the rear frame, and for support of the first and second wheel tracks and the load;

a first wheel track with a first end and a second end which attaches at its first end to the first end of the rear frame and at its second end to the first end of the front frame;

a second wheel track with a first end and a second end which attaches at its first end to the second end of the rear frame and at its second end to the second end of the front frame;

a first ramp with a first end and a second end, which attaches at its first end to the second end of the first wheel track;

a second ramp with a first end and a second end, which attaches at its first end to the second end of the second wheel track;

a guide wheel assembly for attachment to a load and for supporting the load on the first and second wheel tracks and first and second ramps, comprising a bar with a first and a second guide wheel which are attached at either end of the bar;

a winch for winding and unwinding winch cable and for lifting a load or lowering a load up or down the first and second ramps;

winch cable for attaching to the load while it is on the ground and pulling it up the first and second ramps and along the first and second wheel track by winding the winch cable onto or off of the winch, so that the operator is not required to lift any of the weight of the load;

a winch control module which is remote from the pickup, and which is in communication with the winch; and a means of securing loads to the front or rear frame, or the wheel tracks.

2. The front loading truck rack of claim 1, in which the load is a boat and a boat trailer.

3. The front loading truck rack of claim 1, which further comprises a guide pulley for guiding the winch cable over the front frame as the load is raised or lowered on the first and second ramps.

4. The front loading truck rack of claim 1, which further comprises a tongue support which mounts on the front frame and supports part of the weight of the load.

5. The front loading truck rack of claim 1, in which the winch control module communicates with the winch by means of conductive wires.

6. The front loading truck rack of claim 1, in which the winch control module communicates with the winch by means of radio signals.

7. The front loading truck rack of claim 1, in which the means of securing loads to the front or rear frame, or to the wheel tracks is be means of a plurality of chains and tensioning devices.

8. The front loading truck rack of claim 1, in which the winch is an electric winch.

* * * * *